United States Patent Office 2,972,293
Patented Feb. 21, 1961

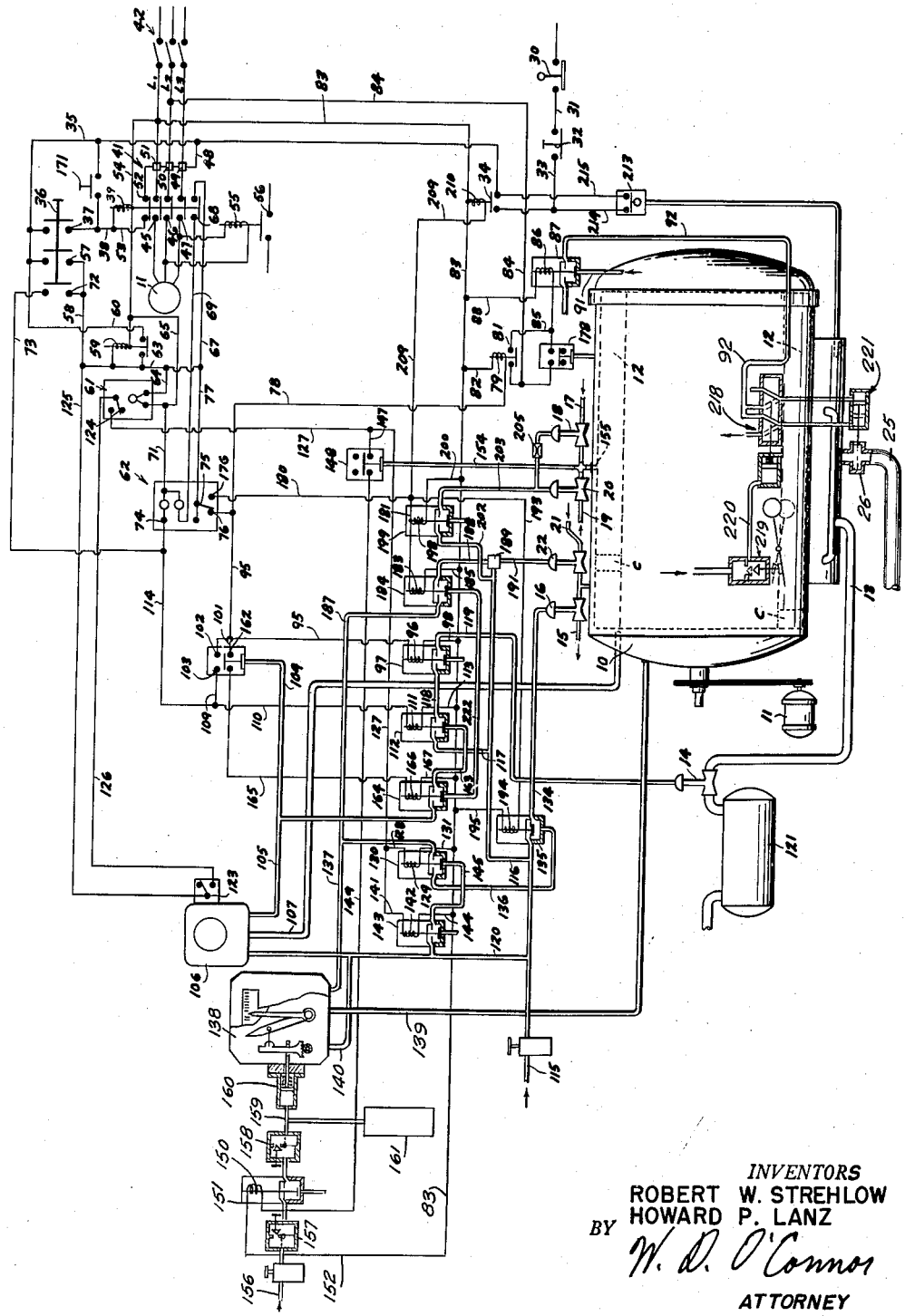

2,972,293

PROCESS CONTROLS FOR STERILIZERS

Robert W. Strehlow, New Berlin, and Howard P. Lanz, Milwaukee, Wis., assignors, by mesne assignments, to Food Machinery and Chemical Corporation, San Jose, Calif., a corporation of Delaware Filed Aug. 22, 1955, Ser. No. 529,705

8 Claims. (Cl. 99—330)

The invention relates generally to the art of processing comestibles and like material sealed in containers and more particularly to improved apparatus for expeditiously sterilizing materials in containers while subjected to agitation.

In the copending application of Lawrence E. Kaap, filed October 28, 1953, Serial No. 388,747, which issued December 17, 1957, as U.S. Patent No. 2,816,841, there is disclosed an improved agitating sterilizer and new methods for achieving rapid and automatic processing of material in sealed containers. As set forth therein, these new methods and improved apparatus are particularly adapted for use in practising the sterilizing process described in U.S. Patent No. 2,517,542, issued August 8, 1950, to La Verne E. Clifcorn, et al.

In accordance with the Clifcorn, et al. patent, containers of material are revolved end-over-end in a retort in a manner to cause optimum agitation of their contents while subjected to the processing effects of a heat transferring medium. The new methods and apparatus set forth in the Kaap patent are adapted to perform and control the various phases of the operation in a manner to effect the entire processing cycle automatically and with facility. To this end, suitable control instruments, power operated valves and interconnecting control equipment are provided for effecting the required heating and cooling operations in the proper sequence under optimum conditions.

It is a general object of the present invention to provide improved automatically controlled sterilizing apparatus for processing mobile material confined in sealed containers.

Another object of the invention is to provide an improved automatically functioning system for controlling the operation of a sterilizing retort.

Another object is to provide an automatic control system for processing containers in a retort wherein heating steam in the retort is maintained at a constant temperature by temperature controlling apparatus while the pressure therein is maintained constant by pressure controlling apparatus operating in conjunction with a pressure relieving vent valve.

A more specific object of the invention is to provide an improved arrangement for admitting heating steam to a processing retort wherein the steam is admitted under temperature responsive control and the purging of air from the retort during the admission of steam is continued until both a predetermined period of time has elapsed and the retort has been heated to a predetermined temperature whereupon the vent valve comes under pressure responsive control.

Another object of the invention is to provide an improved automatic control system for processing material within containers in a sterilizing retort that includes a timed adjusting actuator which operates to change the pressure in the retort at a rate to maintain it compatible with the changing pressure within the containers.

Another object of the invention is to provide an automatically controlled cooling water drain for a retort that is arranged to be held closed until the pressure within the retort falls below a predetermined pressure.

A further object of the invention is to provide an arrangement for effecting gradual downward adjustment of the pressure in a retort while cooling water is being admitted that includes a control system which operates to maintain the retort pressure constant should the supply of cooling water fail.

In accordance with this invention, an agitating sterilizer of the rotary type is provided with an improved control system in containers. To this end, arrangements are provided for supplying processing steam to a retort of the rotary type under the control of a temperature sensing instrument. The control system is so arranged that during the admission of steam to fill the retort, air is purged therefrom through a vent valve that is held open until both a predetermined venting time has elapsed and a predetermined temperature within the retort has been attained. To avoid unintended escape of steam from the retort, the water drain valve at the bottom of the retort is arranged to be held closed during the initial admission of steam. During the heat processing of containers within the retort, the steam is maintained at a constant temperature through operation of automatic temperature controlling apparatus. A second timer is provided for timing the beating phase of the processing cycle. This heating phase timer is arranged to start operating after the retort has been brought up to the predetermined processing temperature and operates to continue the heating phase for the predetermined period of time. The heating timer is interconnected with the control for the motor that rotates the containers, the arrangement being such that should the rotating motor sop, he timer also will stop, but will resume timing automatically when the motor is restarted. Thus, should the operation of the rotating mechanism be interrupted temporarily, the material in the containers will continue to be processed by the much slower non-agitating method until the motor is started again, but the total time recorded by the timer will be only that during which agitation of the material took place. After the heating process has been completed, a preliminary flow of water is admitted to the retort to condense the steam gradually, the pressure being maintained by the admission of air under the control of a pressure regulator. When the steam has been condensed and the substitution of air pressure completed, the full flow of cooling water is admitted to cool the material in the containers as rapidly as possible.

The foregoing and other objects of this invention will become more fully apparent as the following detailed description of improved sterilizing control apparatus constituting an exemplary embodiment thereof is read in conjunction with its representation in the accompanying drawing in which the single figure is a schematic diagram of a processing control system for an automatic sterilizer of the agitating type.

The improved agitating sterilizer that is represented diagrammatically in the drawing may be of the type fully illustrated and described in the previously mentioned patent to Kaap, No. 2,816,841. As fully explained in the Kaap patent and in the previously mentioned Clifcorn et al. patent, agitation of containers by the end-over-end rotation method during processing facilitates heat transfer to the container contents and enables the material therein to be heated rapidly and uniformly to a predetermined sterilizing temperature while avoiding overheating any portion of it.

In sterilizing apparatus of the type described in the Kaap patent, a rotor arranged to carry on its periphery a batch of sealed containers filled with comestibles or like material to be processed is enclosed within a cylindrical retort. During the processing operation the rotor is rotated at the proper speed to effect optimum end-over-end agitation of the material in the containers while they are subjected to the influence of heat transferring fluid within the retort.

Referring now more particularly to the schematic diagram shown in the drawing, the processing retort is there represented by a cylindrical housing 10 provided with driving apparatus represented by an electric motor 11 connected to drive a container carrying rotor 12 enclosed within the housing 10. Steam for effecting heat processing of material sealed in containers C carried by the rotor 12 may be admitted to the retort 10 through a steam pipe 13 under the control of a power operated steam valve 14. Air displaced by the entering steam is vented through a vent pipe 15 under the control of a normally open power operated vent valve 16. At the end of the heating process, water for condensing the steam is admitted through a pipe 17 under the control of a power operated condensing water valve 18 and a further supply of water for cooling the containers C is subsequently admitted through a pipe 19 under the control of a power operated cooling water valve 20. During the condensing process, air under pressure to replace the steam as it condenses is admitted through an air pipe 21 under the control of a power operated air valve 22. The spent cooling water is drained from the retort 10 through a drain pipe 25 under the control of an automatically operating drain valve 26.

The rotor 12 within the retort 10 may be loaded with containers C by manual means as disclosed in the previously mentioned copending application of Lawrence E. Kaap, which issued as Patent No. 2,816,841, or through the operation of mechanical loading apparatus such as that fully disclosed in a second copending application of Lawrence E. Kaap, Serial No. 526,263 filed August 3, 1955, which issued January 12, 1960, as U.S. Patent No. 2,920,552. As described in this second Kaap patent, during the loading of the rotor 12 with containers C, operation of the rotating motor 11 or of any other part of the processing apparatus is prevented through the action of interlocking control mechanism. When loading of the rotor 12 in the retort 10 by the power operated loading apparatus has been completed, its associated control mechanism automatically energizes an interlocking control circuit that operates to energize the processing control system. This interlocking control circuit is represented in the diagram by an interlocking switch 30 which when closed energizes a control conductor 31 that leads from the loading apparatus control system to a normally closed push button stop switch 32. The system is so arranged that the entire processing control circuit may be deenergized by automatically opening the interlocking switch 30 or by manually opening the push button stop switch 32 to stop the process at any time, as might become necessary in an emergency. From the push button stop switch 32, a conductor 33 leads to a normally closed shunting relay 34 from which an energized conductor 35 connects to a process starting push button switch 36.

As shown in the drawing, the starting push button switch 36 is provided with three separate contactors that close progressively to initiate the processing cycle. The first of the three separate contactors to close establishes a circuit for starting the motor 11 which revolves the rotor 12. The second contactor of the switch 36 closes next and serves to energize the timers which time the steam admission period and the processing period respectively. The third contactor of the starting switch 36 which closes last serves to reset the heating timer to "Zero" position for timing the sterilizing period of the process.

After the retort has been loaded and its doors closed, the processing operation may be started by momentarily depressing the starting push button switch 36. When this occurs, a first contactor 37 thereof closes to establish a circuit from the energized conductor 35 to a conductor 38 that is connected to an actuating coil 39 of a motor starting switch 41 thereby moving the switch to closed position. With the motor starting switch 41 closed, electrical energy for operation of the rotor driving motor 11 is made available from a three phase power source indicated by three line conductors L1, L2 and L3. The line conductors are connected to an external supply line by means of the usual disconnect switch 42 and suitable associated protective apparatus. As indicated diagrammatically in the drawing, when the switch 41 is closed, current flows from the line conductors L1, L2 and L3 through closed contactors 45, 46 and 47 respectively of the switch 41 to the rotor driving motor 11.

When the motor starting switch 41 closes, it also establishes a holding circuit in shunt relationship with the momentarily closed contactor 37 of the push button starting switch 36. The holding circuit extends from the energized control conductor 35 through a shunting conductor 48 that leads through normally closed overload protective devices 49, 50 and 51 to closed interlocking contacts 52 of the switch 41 and a conductor 53 that leads to one end of the actuating coil 39 of the switch. From the other end of the coil 39 a return conductor 54 leads to the line conductor L1. When the motor 11 is energized in this manner, it operates to rotate the container carrying rotor 12 within the retort 10 at the desired speed for effecting the required agitation of the material within the containers C during processing thereof. Ordinarily, the speed of rotation of the rotor 12 and its load of containers C is in the order of twenty-five to thirty-five revolutions per minute, depending upon the type of material being processed.

In order to avoid any possibility of the mechanical loading apparatus being operated while the rotor 12 is turning, an inter-locking relay 55 is connected to contacts 46 and 47 of the switch 41 in parallel relationship with the motor 11 in a manner such that the relay is energized whenever the motor is energized. The relay 55 is provided with normally closed contacts 56 that are connected in the control circuit of the loading apparatus described in the previously mentioned Kaap Patent No. 2,920,552, in such a manner that when the motor 11 is energized for running, the interlocking contacts 56 are moved to open position. This opens the loading control circuit and deenergizes the loading apparatus to prevent its operation while the rotor 12 is being turned by the motor 11.

As the starting push button switch 36 is further depressed, a second contactor 57 thereof closes to complete a processing control circuit from the energized control line 35 to a conductor 58. This circuit is then locked in by a holding relay 59 the coil of which is connected at one end to the energized conductor 58 and at the other end to the return conductor 54. The relay 59 when thus energized closes to establish a holding circuit for the processing controls that is independent of the motor switch 41 and extends from the energized control conductor 35 through a shunting conductor 60 and the closed relay 59 to the conductor 58. The conductor 58 serves to energize the driving motors of two timing instruments 61 and 62 that operate respectively to time the period of venting air from the retort 10 during the admission of steam at the beginning of the process and to time the heating phase of the processing cycle after the retort 10 has been brought up to processing temperature. As shown, the energized conductor 58 is connected by a conductor 63 and a conductor 64 to one motor terminal of the venting timer 61, the other motor terminal being connected by a conductor 65 to the return conductor 54 leading to the line conductor L1. From the energized conductor 63 another conductor 67 leads to closed auxiliary contacts 68 of the motor starting switch 41 from which a conductor 69 leads to one motor terminal of the heating phase timer 62. The other motor terminal of the timer 62 is connected by a conductor 71 to the return conductor 65.

The venting timer 61 is so constructed that it starts to operate as soon as its motor is energized and continues to run until the predetermined minimum period for venting has expired. The heating timer 62, however, is of different construction and does not start to operate until the heating phase of the processing cycle begins. Because of the interconnection between the heating timer motor circuit and the motor switch 41 through the contacts 68 thereof, should the rotor driving motor 11 be stopped temporarily by reason of an overload or similar contingency, the motor of the heating timer 62 will likewise stop operating. Then when the driving motor 11 is restarted, upon closing the motor switch 41, the heating timer motor also will be restarted and continue the timing of the process. By this arrangement, only the time during which the material in the containers C is being agitated is recorded by the heating timer and any time during which the material is being heated but not agitated is disregarded. Thus, any temporary shutdown of the driving motor need not disrupt the processing of a batch of containers C but can be disregarded with the assurance that the heating timer will determine the length of the heating operation only in accordance with the time during which the containers were being agitated.

A third contactor 72 of the starting push button switch 36, when momentarily closed, serves to complete a circuit from the energized conductor 58 to a conductor 73 that leads to a clutch terminal 74 of the heating timer 62. Current flowing in this circuit operates to reset the heating timer to "Zero" position in which a switch arm 75 thereof makes contact with a contactor 76 but does not operate to start the timer running as yet. In order to avoid the possibility of steam escaping through the drain pipe 25 at the beginning of the process, the drain valve 26 is prevented from opening during the initial introduction of steam. For this purpose, a control circuit extends from the energized conductor 35 through the second contact 57 of the starting push button switch 36, the conductor 58, the conductor 63 and a conductor 77 leading to the switch arm 75 of the heating timer 62. With the switch arm 75 in the position shown in the diagram and making contact with the contactor 76, the circuit is completed through a conductor 78 which is connected with a coil 79 of a relay 81, a conductor 82 leading from the coil 79 to a return conductor 83 that connects with the line conductor L1. When the relay 81 is energized in this manner it closes a circuit leading from the line conductor L2 through a conductor 84, the closed relay 81 and a conductor 85 to an actuating coil 86 of a solenoid valve 87, a conductor 88 leading back to the return conductor 83. With the solenoid coil 86 energized, the valve 87 is moved to closed position to prevent the flow of air under pressure from a pressure line 91 into a conduit 92 leading to the actuating mechanism of the drain valve 26. By this arrangement, the drain valve 26 is held in closed position during the introduction of steam into the retort 10.

When the apparatus is ready to start processing, the vent valve 16 is in open position to permit free escape of air through the vent 15 as it is replaced by steam entering the retort. With the switch arm 75 of the timer 62 in the position shown, a circuit is established from the energized conductor 77 through the switch arm 75 and the contactor 76 to a conductor 95 which leads to a coil 96 of a solenoid valve 97, a conductor 98 completing the circuit to the return conductor 83. With the solenoid coil 96 energized, the valve 97 is moved to the position shown in the drawing to close the exhaust connection from the steam valve 14. Another control circuit branching from the energized conductor 95 includes a conductor 101 leading to upper contacts 102 of a pressure switch 103. The pressure switch 103 is connected by a conduit 104 to a conduit 105 leading from a temperature controlling instrument 106. The instrument 106 is connected by a conduit 107 to sense the temperature within the retort 10 and operates to limit the maximum temperature therein. Since at this time the temperature within the retort is low, the temperature controller 106 operates to permit air to flow into the output conduit 105 thereby building up pressure of approximately twenty pounds to the square inch which is transmitted through the conduit 104 to move the pressure switch 103 to the upper position and close the contacts 102. This completes a circuit from the energized conductor 95 through a conductor 109 and a branch conductor 110 to a coil 111 of a solenoid valve 112, a conductor 113 completing the return circuit to the return conductor 83. Another branch conductor 114 leading from the energized conductor 109 to the conductor 73 serves as a holding circuit through the closed contacts 102 to maintain the timer terminal 74 energized after the starting push button switch 36 is released. This locks the timer in "Zero" position and prevents it from operating until the circuit is broken at the beginning of the heating period.

With the solenoid 111 of the solenoid valve 112 energized, the valve is moved to a position in which control air under pressure is admitted from a pressure source represented by a conduit 115 through a branch conduit 116, and another branch conduit 117 to the energized solenoid valve 112 through which it passes into a conduit 118 leading to the energized solenoid valve 97. The valve 97 being in the position shown, as previously explained, permits the air under full pressure from the source conduit 115 to enter a conduit 119 that leads to the steam controlling valve 14, the air pressure moving the steam valve to wide open position in order to fill the retort 10 with steam as quickly as possible. Air under pressure also flows from the source conduit 115 through a conduit 120 to the temperature controlling instrument 106 that admits pressure to the output conduit 105 as required.

Since opening the steam valve 14 suddenly in this manner results in an instantaneous demand for a large quantity of steam, it is preferable to provide a steam accumulator 121 in the steam line as near as possible to the retort 10. By this arrangement the accumulator 121 may be filled gradually and continuously from a steam boiler at a substantially uniform rate while having the capability of intermittently furnishing a large volume of steam to the retort 10 in a short period of time.

With the steam flowing into the retort 10 from the steam accumulator 121, the temperature within the retort will increase steadily as the air therein escapes through the open vent 15 and is replaced by the entering steam. The increasing temperature within the retort 10 is sensed by the temperature controlling instrument 106 and when a predetermined minimum temperature therein has been established, in the order of 195° F. to 200° F. in this case, an auxiliary temperature responsive switch 123 on the temperature controller 106 moves to closed position. Likewise, when the minimum time for which the venting timer 61 is set has expired, a switch 124 thereof also moves to closed position. When both the minimum temperature and minimum venting time conditions are satisfied, it is quite certain that substantially all of the air has been purged from the retort. The closed series connected switches 123 and 124 then complete a control circuit which places the vent valve 16 under pressure control. This circuit extends from the closed relay 59 through the conductor 58 and a conductor 125, the closed switch 123 of the temperature controller 106, a conductor 126 and the closed switch 124 of the timer 61 to a conductor 127. From the energized conductor 127 a conductor 128 leads to the coil 129 of a solenoid valve 130, a conductor 131 completing the circuit to the return conductor 83.

With the coil 129 of the solenoid valve 130 energized, the valve is moved to the position shown in which a control connection is established from the pressure actuated vent valve 16 which is now wide open, through a conduit 134, a deenergized solenoid valve 135, a conduit 136, the energized solenoid valve 130 and a conduit 137 to the output side of a pressure controller instrument 138. By this connection the vent valve 16 is placed under the control of the pressure controller 138 which is connected by a conduit 139 to sense the pressure within the retort 10. The pressure controller 138 then operates to close the vent valve 16 and to keep it closed so long as the pressure within the retort is below the pressure for which the controller is set. As the steam continues to flow into the retort without restriction the pressure increases steadily, the vent valve 16 being opened intermittently by operation of the pressure controller 138 whenever the pressure within the retort exceeds the predetermined pressure for which the controller 138 is set at the moment. Air under pressure for operating the pressure controller 138 is supplied from the source conduit 115 through the conduit 120 and a branch conduit 140.

Energization of the conductor 127 leading from the venting timer 61 also energizes a circuit extending through a branch conductor 141, a coil 142 of a solenoid valve 143 and a conductor 144 leading to the return conductor 83. The energization of the solenoid valve 143 has no immediate effect other than closing its exhaust port, as a connecting conduit 145 leading from the solenoid valve 143 to the solenoid valve 130 is closed by the valve 130 which is now in the energized position as shown and previously explained.

The energization of conductor 127 also energizes another control circuit leading through a branch conductor 147 to a pressure responsive switch 148 and thence by a conductor 149 to a coil 150 of a solenoid valve 151, a conductor 152 forming the return connection to the return conductor 83. The pressure responsive switch 148 is connected by a conduit 154 to the retort side of the water valves 18 and 20 which discharge through a nozzle pipe 155 into the retort 10. The switch 148 is therefore connected to respond to the pressure of water flowing into the retort 10 through the nozzle pipe 155 and remains closed until the water is turned on and the inflowing water pressure exceeds a predetermined minimum amount. The solenoid valve 151 when thus energized through the water pressure responsive switch 148 admits air under pressure from a line 156 representing a pressure source through an adjustable inwardly operating flow restrictor 157, the open solenoid valve 151 and an adjustable outwardly operating flow restricter 158, into a conduit 159 leading to a pneumatic cylinder actuating device 160 operatively connected to adjust the setting of the pressure controller 138. The pneumatic cylinder actuator 160 operates as an adjusting device to change the pressure setting of the pressure controller 138, the arrangement being such that as air is admitted to the actuating cylinder 160, the setting of the pressure controller 138 is changed from a lower to a higher pressure at a predetermined rate of increase, the minimum pressure setting being in the order of one pound per square inch. Accordingly, when air is admitted from the source 156 through the flow restrictor 157 the pneumatic cylinder 160 causes the setting of the pressure regulator 138 to increase gradually at a rate determined by the adjustment of the inwardly operating flow restrictor 157. The other flow restrictor 158 has no appreciable effect on the incoming air since it is designed to operate in the opposite direction on the low pressure exhaust air, for regulating the rate of downward adjustment. To insure that the rate of adjustment of the pressure regulator 138 is sufficiently gradual, the conduit 159 has connected to it a small tank 161 that increases the capacity of the actuator system to slow the action and this results in the flow restrictors being less critical to adjust.

As explained in the previously mentioned patents, when a batch of containers C in the retort 10 are first subjected to the influence of heating steam under pressure it is necessary to limit the pressure applied in order to avoid damaging the containers since their contents are at substantially atmospheric pressure. However, as the containers become heated, pressure builds up within them thereby balancing the external pressure so that additional steam pressure may be tolerated within the retort without damaging the containers. The flow regulator 157 is accordingly so adjusted that it causes the cylinder actuator 160 to change the pressure setting of the regulator 138 in such a manner that pressure is permitted to build up within the retort 10 at approximately the rate at which the pressure increases within the containers. Since the steam flows in rapidly and continuously, the pressure controller 138 may be called upon to operate the vent valve 16 to release any excessive pressure that may occur during the accumulation of pressure within the retort 10, should the steam flow in at a rate faster than the rate of pressure increase established by operation of the pressure controller.

As the steam pressure in the retort 10 continues to rise under the control of the pressure controller 138, the temperature rises correspondingly until the desired processing temperature is established within the retort. The processing temperature differs for different materials being processed, and as an example may be in the order of 260° F. to 265° F. When the retort is heated to the processing temperature for which the temperature controlling instrument 106 is adjusted, the temperature controller operates to shut off the flow of air under pressure into the output conduit 105 thereby reducing the pressure therein to about five to seven pounds. This causes the pressure switch 103 to move down to its lower position in which it opens the upper contacts 102 and closes lower contacts 162. With contacts 102 open, solenoid valve 112 is deenergized thereby establishing a connection from the steam controlling valve 14 through the conduit 119, the energized solenoid valve 97, the conduit 118 and the deenergized valve 112 to a conduit 163 which connects with a solenoid valve 164.

With the pressure switch 103 in the lower position the closed contacts 162 establish a circuit from the energized line 101 to a conductor 165 that leads to a coil 166 of the solenoid valve 164, a conductor 167 completing the circuit to the return conductor 83. With the coil 166 of the solenoid valve 164 thus energized, the valve is opened to establish a continuing connection from the conduit 163 to the conduit 105 which is the ouput conduit of the temperature controlling instrument 106. Accordingly, the steam admitting valve 14 is thereby placed under the control of the temperature controlling instrument 106.

The arrangement is then such that when the temperature within the retort 10 increases to the processing temperature for which the temperature controller 106 is set, the steam valve 14 will be closed to shut off further flow of steam into the retort. Likewise, when the temperature in the retort drops below the processing temperature, the steam valve 14 will be opened automatically to admit additional steam as required for restoring the retort temperature. Meanwhile, the pneumatic cylinder actuator 160 advances the pressure controller 138 to its upper limit at which it responds to a pressure one or two pounds higher than the pressure of steam corresponding to the processing temperature established by the temperature controller 106. Thus, the control of admission of the steam into the retort 10 passes to the temperature controller 106 with the pressure controller 138 serving only to release any excess pressure which might result from an accumulation of air in the retort, for example.

When the pressure responsive switch 103 moves down because of the drop in pressure in the output conduit 105 of the temperature controller 106 upon the steam in the retort 10 rising in temperature to the processing temperature, the opening of the upper contacts 102 also breaks the circuit extending through the conductor 109 and the conductor 114 to the terminal 74 of the heating timer 62. This deenergizes the timer clutch and permits the timer to start operating for measuring the time during which the retort is held at the predetermined processing temperature. Processing of the material in the containers C then proceeds at the predetermined processing temperature while the container contents are continuously agitated through end-over-end rotation thereof with the rotor 12. During this heating phase of the processing cycle, the temperature controller operates occasionally as may be required to admit additional steam to maintain the steam temperature, while the pressure controller operates as necessary to relieve any excess pressure such as may develop from an accumulation of air in the retort 10.

If it should happen that during the heating phase of the process the driving motor 11 should stop because of a momentary overload or the like causing one of the overload devices 49, 50 or 51 to open and deenergize the motor switch 41, the contacts 68 thereof will open the circuit through conductors 67 and 69 to the driving motor of the heating timer 62. This will cause the timer 62 to stop but it will not reset it to the "Zero" position because the interlocking relay 59 remains closed and maintains the processing control circuit energized. Under these circumstances, heating of the containers C will continue but without agitation of their contents and the external pressure on the containers will be maintained to counterbalance and prevent damage from the internal pressure therein, which is considerable at that temperature. After the temporary difficulty with the motor 11 has been corrected, the switch 41 may be reclosed to start the motor by pressing a separate motor restarting push button switch 171 that reestablishes the starting control circuit. With the switch 41 reclosed, the contacts 68 upon closing, reenergize the motor of the timer 62 but do not reset it, whereupon the timer continues to record the time during which containers C are subjected to heating while being agitated.

If it were not for this holding arrangement and the timer 62 were reset to "Zero" position when the motor 11 stops the material in the containers might be overcooked when the motor was restarted since they might be subjected to the effects of steam at processing temperature and while being agitated for nearly twice as long as required for the normal sterilizing operation. Furthermore, if temporary stopping of the motor 11 were to result in deenergizing the processing control circuit, the containers might be damaged by the sudden change in external pressure that would result and the entire batch of material being processed thereby rendered unfit for use. Through causing the motor of the heating phase timer 62 to stop during the time when the rotating motor 11 is stopped, the timer 62 records only the heating time during which the containers were being agitated through end-over-end rotation thereof with the rotor 12. Thus, the processing of a batch of containers may be continued after the motor 11 is restarted with the assurance that they have been subjected to the minimum heating effect required to thoroughly sterilize them, the time during which the containers were heated without agitation being disregarded since the heating effect then is slow.

After the heating phase of the process has continued for its normal length of time, which is ordinarily in the neighborhood of 10 minutes more or less, depending upon the type of material being processed, the timer 62 runs out the predetermined time and operates to end the heating phase. The processing operation is then switched to the cooling phase in order that the containers may be cooled as promptly as possible to preserve the quality of the material. To this end the steam valve and the vent valve are both closed and water is admitted to effect the cooling. When the timer 62 operates at the end of the heating period, the time switch arm 75 thereof shifts from contactor 76 to a contactor 176. This deenergizes contactor 76 and the conductor 78 connected to it and results in deenergizing the relay coil 79, causing the relay 81 to open. However, relay 81 is now shunted by the contacts of a pressure switch 178 which is connected to the retort 10 and is closed in response to high pressure within the retort, the switch establishing a parallel circuit from the line conductor L2 through the conductor 84 and the switch 178 to the conductor 85 which continues to energize the coil 86 of the solenoid valve 87. Since the coil 86 remains energized, the valve 87 remains closed for the time being.

With the contactor 76 of the timer 62 deenergized, the circuit leading from it through conductor 95 and coil 96 of the solenoid valve 97 is deenergized thereby permitting the valve to shift to the position in which the conduit 119 connected with the steam valve 14 is vented to atmosphere through the exhaust port of the valve. This results in closing the steam valve 14 and preventing the entrance of additional steam into the retort. In deenergizing the contactor 76 the timer also deenergizes the circuit leading through the conductor 95, the contacts 162 of the pressure switch 103 and the conductor 165 to the coil 166 of the solenoid valve 164. Deenergizing the coil 166 causes the valve 164 to shift to a position in which the temperature controller 106 is disconnected from the conduits and valves that had previously connected it with the steam controlling valve 14.

Since the internal pressure within the containers in the retort 10 remains high at the sterilizing temperature, it is necessary to replace the pressure exerted by the steam with equivalent air pressure after the steam is turned off in order to maintain the external pressure on the containers to counterbalance the internal pressure and prevent damage from excessive pressure difference. This is accompanied simultaneously by operation of the timer 62.

As previously mentioned, at the end of the predetermined heating time, the timer 62 operates to shift the switch arm 75 thereof to the contactor 176. This establishes a circuit from the arm 75 through the contactor 176, a conductor 180 and a conductor 181 to a solenoid coil 183 of a solenoid valve 184, a conductor 185 completing the circuit to the return conductor 83. The energization of the solenoid valve 184 establishes a control connection from the pressure controller instrument 138 through the conduit 137 and a branch conduit 187 to the valve 184 and thence through a conduit 188 to an air relay 189. When the pressure within the retort 10 drops below the predetermined external pressure required to prevent damage to the containers therein, the pressure controller instrument 138 is actuated through the interconnecting conduit 139 in a manner to exert air pressure through the conduit 137, the branch conduit 187 and the conduit 188 to effect opening of the air relay valve 189. This establishes a control connection from the air pressure source 115 through the conduit 116 the open relay valve 189 and a conduit 191 that is connected to the air controlling valve 22 thereby opening it quickly to admit air from the pressure line 21 into the retort 10 to replace the steam pressure. When the required pressure in the retort 10 is reestablished, the pressure controller 138 causes the relay 189 to close thereby closing the air admission valve 22.

Energization of the timer contactor 176 and the conductor 180 also result in energizing a branch conductor 193 leading to a coil 194 of the solenoid valve 135, a conductor 195 completing the circuit to the return conductor 83. With the coil 194 energized, the solenoid valve 135 is moved to a position in which air under pressure is admitted from the pressure source 115 through the valve 135 and the conduit 134 to the vent valve 16. Direct air pressure on the vent valve 16 moves it to closed position and holds it closed during the cooling phase of the process to obviate the danger of losing the external pressure in the retort through the vent 15. Various small bleed valves and other openings in the retort 10 permit the air pressure therein to bleed away, the pressure controller 138 operating to admit additional air as needed for maintaining the required pressure.

With the timer contactor 176 and the connected conductor 180 energized, a circuit is established through the conductor 181 and a coil 198 of a solenoid valve 199, a conductor 200 completing the circuit to the return conductor 83. With the solenoid valve 199 energized, a control circuit is established from the air pressure source 115 through the conduit 116, a branch conduit 202, the energized solenoid valve 199 and a conduit 203 to the condensing water valve 20. The air pressure acting on the water valve 20 causes it to open for admitting a moderate flow of cooling water from the pipe 19 through the pipe 155 leading into the retort 10 to condense the steam therein, the rate of condensing action being such that air admitted through the air valve 22 can readily maintain the pressure as it flows into the retort to replace the steam being condensed. A flow restrictor 205 connected with the conduit 203 admits air therefrom at a reduced rate to the cooling water valve 18 in such a manner that the valve 18 opens after a predetermined time delay in order to admit a full flow of cooling water from the water line 17 into the nozzle pipe 155. The time delay provided by the flow restrictor 205 is sufficient to permit the gradual condensation of the steam by the moderate flow of water entering through the condensing water valve 20 in order that the steam pressure may be fully replaced by air pressure before the full flow of cooling water is admitted through the valve 18.

If the cooling water flows into the retort 10 through the valves 18 and 20 under adequate pressure, it exerts pressure through the conduit 154 upon the pressure switch 148 thereby moving it to open position to permit reduction in the pressure within the retort. This deenergizes the circuit extending from the pressure switch 148 through the conductor 149 and the coil 150 of the solenoid valve 151 thereby causing the valve 151 to shut off the air pressure being exerted upon the pressure setting cylinder or actuator 160 and to connect the cylinder to exhaust to atmosphere. Pressure in the actuating cylinder 160 then decreases at a predetermined rate as the air bleeds away through the conduit 159, the exhaust flow restrictor 158 and out through the valve 151. This causes the pressure setting of the pressure controller 138 to be reduced gradually, the rate of reduction being controlled by the flow restrictor 158 to cause the pressure within the retort 10 to drop at a rate corresponding approximately with the rate of reduction of pressure within the containers as they are cooled rather rapidly by the inflowing cooling water. In the event that the flow of cooling water is not sufficient, to effect cooling of the containers at the desired rate, the pressure switch 148 will not open and the external pressure on the containers will not be reduced. As previously mentioned, the air pressure within the retort 10 continually bleeds away through various small openings and consequently with the pressure controller 138 being adjusted downwardly, the external pressure on the containers is progressively reduced, additional air being admitted by operation of the controller 138 in the event that the pressure bleeds away too rapidly.

A further result of energizing contactor 176 of the timer 62 is to energize a circuit leading from the contactor 176 through the conductor 180 to a branch conductor 209 that leads to an actuating coil 210 of the relay 34 in the interlocking control conductor 33, the coil 210 being connected at its other end directly to the return conductor 83. With the relay coil 210 energized, the relay 34 is moved to open position, but this does not break the control circuit since the relay 34 is in parallel with and is shunted by a cooling water temperature responsive switch 213. As shown, the temperature responsive switch 213 is connected into the lower part of the retort housing 10 and is now closed by reason of the fact that it is in contact with the relatively warm spent cooling water which has been warmed from flowing over the hot containers C. As shown in the diagram, the relay 34 is shunted by a conductor 214 that leads from the control conductor 33 to the closed switch 213 from which another shunt conductor 215 leads to the energized control conductor 35.

As the containers in the retort continue to cool, and the pressure is reduced gradually under the control of the pressure controller 138, the pressure switch 178 which has been held closed by the retort pressure, drops to open position when the pressure in the retort is reduced to about 15 pounds per square inch or less. This opens the shunt circuit in parallel with the now open relay 81 and thereby deenergizes the coil 86 of the solenoid valve 87. With the valve 87 deenergized, it moves to open position in which air under pressure is admitted from the pressure line 91 through the conduit 92 to a control valve 218 that is arranged to operate the drain valve 26. The drain control valve 218 is in turn controlled by a float valve 219 connected to it by a conduit 220 and operating in response to an accumulation of water in the bottom of the retort. With the float valve 219 in the raised or open position because of water in the retort, as shown in the drawing, air under pressure is admitted to the conduit 220. This causes the drain control valve 218 to be moved to the right as shown, thereby admitting air under pressure from the conduit 92 to the left end of an actuator cylinder 221 which operates to move the drain valve 26 to open position for draining the water from the retort into the drain 25. When the water drains away, the float valve 219 closes and the control valve 218 moves to the left thereby admitting air under pressure to the right end of the cylinder 221 to close the drain valve 26. Cooperative action of these valves provides for automatically draining away the spent cooling water into the drain 25 with the assistance of the moderate pressure remaining within the retort 10, the arrangement being such that during the time the pressure in the retort is high, the drain valve 26 is held closed.

If during the cooling phase of the processing operation the supply of cooling water should fail, the pressure responsive switch 148 will move down to closed position thereby reestablishing the circuit through the conductor 149 to energize the coil 150 of the solenoid valve 151. With the solenoid valve 151 thus energized, pressure is again admitted from the source conduit 156 through the flow restrictor 157 into the control cylinder 160 in a manner to check the downward adjustment of the pressure controller 138 and prevent loss of external pressure on the containers within the retort until the flow of water can be reestablished to cool them. With the water pressure normal and the pressure switch 148 open, control air continues to escape from the pneumatic cylinder 160 through the solenoid valve 151 at the rate determined by the flow restrictor 158.

Since the temperature within the retort 10 is now lower than the temperature setting of the temperature controller instrument 106, pressure is admitted by the instrument 106 into the conduit 105 and which operates through the conduit 104 to move the pressure switch 103 to its upper position. This opens switch contacts 102 and deenergizes the circuit through conductor 165 and coil 166 of the solenoid valve 164. With the valve 164 deenergized, a connection is effected from the conduit 163 through the valve 164 to a conduit 222. The upper contacts 102 of the pressure switch 103 being then closed, a circuit is reestablished through the conductor 110 and the coil 111 of the solenoid valve 112. With the solenoid valve 112 energized, the conduit 163 is closed so that no air may flow into or out of the conduit 222. When the pressure within the retort 10 has been reduced to about one pound per square inch the pressure control setting device 160 reaches the end of its stroke and the pressure is then maintained at one pound to assist in discharging the spent cooling water.

As the retort 10 continues to cool, the temperature sensitive switch 123 of the temperature controller 106 moves to open position to prepare the circuit for the subsequent venting period at the beginning of the next processing cycle. The cooling operation is continued until the containers are cooled to a temperature such that just sufficient heat remains in them to dry them completely after they are removed from the retort 10. This temperature is ordinarily in the neighborhood of 90 or 100 degrees Fahrenheit but varies somewhat depending upon the material being processed. As this temperature is approached, the temperature of the spent cooling water flowing out through the drain 25 becomes progressively lower since less heat is transmitted to it from the containers. The drain water temperature switch 213 is accordingly adjusted to be actuated to open position when the drain water temperature is reduced to the temperature resulting from flowing over the containers when they are at approximately 90 to 100 degrees Fahrenheit. When this condition obtains, the water temperature responsive switch 213 opens and since the relay 34 in parallel therewith has previously opened, this results in terminating the processing cycle by opening the main control circuit through the conductors 31 and 35, thereby deenergizing the entire processing control system in the same manner that occurs when the stop push button switch 32 is opened.

Since the entire control circuit is deenergized at the end of the processing cycle, all of the solenoid valves are deenergized to place the control system in condition for starting a subsequent processing operation. When the solenoid valve 199 is thereby deenergized, it operates to disconnect the conduit 203 from the pressure line and to exhaust it to atmosphere thereby permitting the water valves 18 and 20 to move to closed position for shutting off further flow of cooling water into the retort. Likewise, solenoid valve 135 is deenergized and moved to a position in which direct air pressure on the vent valve 16 is cut off and the vent valve is permitted to move to open position. Any air trapped in the vent valve control lines then escapes through the conduit 134, the deenergized solenoid valve 135, the conduit 136, the deenergized solenoid valve 130, the conduit 145 and the deenergized solenoid valve 143 to atmosphere. With the solenoid valve 184 deenergized, it moves to a position in which the pressure controller instrument 138 is disconnected from the air admission valve 22. This causes the air relay 189 to close thereby closing the air valve 22 and shutting off further flow of air into the retort 10. The conduit 187 from the instrument 138 is then connected through the valve 184 to the conduit 222 which is in turn connected to the closed conduit 163 as previously explained.

Since the main control conductor 35 is now deenergized, the coil 39 of the motor switch 41 is deenergized thereby permitting the motor switch to drop to open position and stopping the rotor driving motor 11. With the motor circuit deenergized, the interlocking relay 55 is deenergized and moves to closed position whereupon its contacts 56 complete a control circuit that energizes the loading control system for effecting automatic loading and reloading of the retort 10 as set forth in the previously mentioned Kaap Patent No. 2,920,552. When the loading control circuit is thus energized, it operates to open the interlocking switch 30 thereby preventing reenergization of the processing control circuit conductor 31 until after the loading operation has been completed.

From the foregoing description of the exemplary control system set forth herein, and the explanation of its improved method of operation, it is apparent that new and improved arrangements have been provided by this invention for effecting automatic and efficient sterilization of food materials or similar products confined in sealed containers. This is accomplished through the operation of the improved process controls for sterilizers set forth herein whereby the processing retort is filled with steam quickly and completely, the process is accurately timed and proper temperature and pressure conditions are maintained throughout the processing cycle, in order that the material being processed may be thoroughly sterilized without being subjected to possible damage through inaccurate timing or improper temperature conditions.

Although a specific example of processing control apparatus for a material sterilizer has been set forth in detail herein as illustrative of the present invention and by way of a full description of a practical and useful embodiment thereof, it is to be understood that somewhat different control systems may be substituted by those familiar with the art without departing from the spirit and scope of this invention as defined in the subjoined claims.

The invention having now been fully described, what is claimed is:

1. In sterilizing apparatus for processing material sealed in containers, a retort adapted to confine containers of material to be processed, a source of steam for heating the containers in said retort, a steam controlling valve arranged to control the admission of steam from said source into said retort, a temperature responsive control instrument connected to respond to the temperature within said retort and operative to close said steam valve when said retort becomes heated to a predetermined sterilizing temperature, a vent valve arranged to vent air from said retort as it is displaced by entering steam, an adjustable pressure responsive control instrument connected to respond to the pressure within said retort and operative to open said vent valve when the pressure in said retort rises above the pressure setting of said instrument, a control system including means operatively arranged to hold open both said steam valve and said vent valve at the beginning of a processing operation in order to fill said retort with steam quickly, a timer in said control system arranged to time the admission of steam into said retort, a temperature responsive switch in said control system arranged to respond to a predetermined minimum temperature within said retort, control means in said control system operative upon both the expiration of a minimum steam admission time and the attaining of a minimum retort temperature and acting in response to joint action of said timer and said temperature responsive switch to cause said control system to place said vent valve under the control of said adjustable pressure responsive control instrument, and control means including a timed adjusting actuator in said control system arranged to increase the pressure setting of said adjustable pressure responsive control instrument at a predetermined rate comparable with the rate of heating of said containers in such a manner that pressure is vented from said retort whenever it rises to an amount that might cause damage to the containers through materially exceeding their internal pressure at the time, said timed control means serving to increase the pressure setting of said pressure control instrument gradually to a maximum setting slightly above the steam pressure corresponding to the predetermined sterilizing temperature, the arrangement being such that during the sterilizing operation the sterilizing temperature is maintained by steam admitted to said retort by operation of said temperature control instrument while excess pressure that may result from accumulation of air in said retort is vented therefrom by operation of said pressure control instrument.

2. In apparatus for sterilizing material confined in sealed containers, a retort arranged to enclose a plurality of containers of material to be sterilized, a steam valve connected to control the admission of steam into said retort, a vent valve arranged to control the venting of air from said retort as it is displaced by the entering steam, a pressure controlling instrument connected to respond to the pressure within said retort, a process controlling system including means to hold open both said steam valve and said vent valve for filling said retort with steam quickly at the beginning of a processing cycle, a timer connected in said system and operative to time the admission of steam into said retort, a temperature responsive device connected in said control system and responsive to the temperature within said retort, and control means in said control system responsive to said timer and to said temperature responsive device operating conjointly and operative when said timer indicates that steam has been admitted for a predetermined minimum time and also said temperature responsive device indicates that the temperature within said retort has risen to a predetermined minimum temperature to thereupon connect said pressure controlling instrument to operate said vent valve in a manner to relieve excessive pressure from within said retort in accordance with the pressure setting of said instrument, the arrangement being such that air may be purged expeditiously from said retort through said open vent valve to insure rapid and complete filling of said retort with steam whereupon further venting occurs only under the control of said pressure controlling instrument as said retort is brought up to sterilizing temperature.

3. In a sterilizing apparatus for processing material confined in containers, a retort arranged to enclose a batch of containers of material being processed, a source of steam operatively connected to admit steam into said retort to heat the batch of material for sterilizing it, a vent valve connected to said retort and operative to control venting of excess pressure from said retort, an adjustable control instrument connected to respond to the pressure within said retort and operative to open said vent valve when the pressure therein exceeds the pressure setting of said instrument, and automatic control apparatus including a timed adjusting actuator operative to increase the pressure setting of said adjustable control instrument at a predetermined rate during the admission of steam into said retort, the arrangement being such that steam may be admitted into said retort in a manner adapted to build up pressure therein at a predetermined rate as the containers of material are being heated while said automatic control apparatus and said pressure control instrument operate said vent valve in a manner to prevent the pressure in said retort from increasing at a rate faster than the rate of increase of pressure within the containers being heated, whereby the increasing external pressure on the containers within said retort will be substantially counter-balanced continuously by the increasing internal pressure developed within the containers as they are heated by the entering steam.

4. In a processing retort for sterilizing material confined in containers, means to admit steam into said retort to process the material therein, means to admit water into said retort to cool the processed material in the containers, a drain valve arranged to drain spent cooling water from said retort, power operated control apparatus arranged to control said drain valve in accordance with the pressure within said retort for draining the spent cooling water from said retort, and a pressure responsive element disposed to respond to the pressure within said retort and operative upon said power operated control apparatus to prevent opening of said drain valve until the pressure within said retort falls below a predetermined maximum pressure.

5. In sterilizing apparatus for processing material confined in sealed containers, a retort adapted to enclose a plurality of containers of material being processed, a steam valve connected to control the admission of steam into said retort for heating the material being processed, a vent valve arranged to control the purging of air from said retort and to relieve excess pressure therefrom, a temperature responsive control instrument connected to sense the temperature within said retort and operatively connected to close said steam valve when the temperature in said retort exceeds a predetermined sterilizing temperature and to open said steam valve when the temperature drops below the sterilizing temperature, an adjustable pressure responsive control instrument connected to sense the pressure within said retort and operatively connected to open said vent valve when the retort pressure exceeds a predetermined maximum pressure for which said instrument is adjusted, and control apparatus including a timed adjusting actuator arranged to change the adjustment of said pressure responsive instrument at a predetermined rate of change in a manner to maintain the pressure within said retort compatible with the pressure within the containers of material being processed therein while they are being heated to sterilizing temperature.

6. In retort apparatus for processing material in sealed containers, a retort adapted to confine a plurality of containers of material to be processed, a source of steam operatively connected to furnish steam to said retort for heating the material being processed, a steam valve arranged to control the flow of steam from said source into said retort, a vent valve arranged to control the venting of fluid from said retort, a pressure responsive control instrument operatively connected to respond to pressure within said retort and to operate said vent valve accordingly, control means including a timed adjusting actuator arranged to increase the pressure setting of said pressure responsive control instrument progressively in a manner to control the pressure within said retort through operation of said vent valve for limiting it to pressures below that which might cause injury to the containers in said retort the pressure setting increasing at a rate compatible with the increase in the internal pressure within said containers as they are heated by the steam, and a temperature responsive control instrument operatively connected to respond to the temperature within said retort and to operate said steam valve accordingly, the arrangement being such that said temperature responsive control instrument operates to close said steam valve when the temperature within said retort reaches a predetermined sterilizing temperature and to open said steam valve when the temperature drops below the sterilizing temperature while said pressure responsive control instrument serves to release pressure in excess of the pressure of steam corresponding to the sterilizing temperature to purge air from said retort.

7. In apparatus for sterilizing material confined in sealed containers, a retort arranged to enclose a plurality of containers of material to be sterilized, a steam valve connected to control the admission of steam into said retort, a vent valve arranged to control the venting of air from said retort as it is displaced by the entering steam, an adjustable pressure controlling instrument connected to respond to the pressure within said retort, a process controlling system including means to hold open both said steam valve and said vent valve for filling said retort with steam quickly at the beginning of a processing cycle, a timer connected in said system and operative to time the admission of steam into said retort, a temperature responsive instrument connected in said control system and responsive to the temperature within said retort, control means in said control system responsive to said timer and to said temperature responsive instrument operating conjointly and operative when said timer indicates that steam has been admitted for a predetermined minimum time and also said temperature responsive instrument indicates that the temperature has risen to a predetermined minimum temperature to thereupon connect said pressure controlling instrument to operate said vent valve in a manner to relieve excessive pressure from within said retort in accordance with the pressure setting of said instrument, the arrangement being such that air is purged expeditiously from said retort through said open vent valve to insure rapid and complete initial filling of said retort with steam, control means arranged to increase the pressure setting of said adjustable pressure controlling instrument gradually to a predetermined maximum pressure slightly greater than the pressure of steam corresponding to the desired sterilizing temperature, whereupon further venting occurs only under the control of said pressure controlling instrument as said retort is brought up to sterilizing temperature, and control means responsive to said temperature responsive instrument and operative thereby upon said retort attaining the predetermined sterilizing temperature to connect said temperature responsive instrument to operate said steam valve, whereby the predetermined sterilizing temperature is then maintained by operation of said steam valve under control of said temperature responsive instrument during the sterilizing operation.

8. In processing apparatus for sterilizing material confined in sealed containers, a retort arranged to enclose containers of material to be sterilized, a steam valve connected to admit steam into said retort, a drain valve arranged to drain water from said retort, an adjustable pressure controlling instrument connected to respond to pressure within said retort, a process controlling system operative at the conclusion of a predetermined sterilizing phase to close said steam valve to terminate the admission of steam into said retort, an air valve connected to admit air under pressure into said retort, means operated by said process controlling system to connect said air valve for operation by said adjustable pressure controlling instrument in a manner to admit air to replace the processing steam, means operated by said process controlling system to admit cooling water into said retort to cool the processed containers therein, control means responsive to the pressure of the entering cooling water and operative while the water pressure is higher than a predetermined minimum to effect gradual downward adjustment of said pressure controlling instrument in a manner to maintain the air pressure in said retort comparable to the internal pressure within the containers as they are cooled, the arrangement being such that should the water pressure fail the air pressure will be maintained constant until the flow of cooling water is re-established, control means responsive to pressure within said retort and operative upon said drain valve to prevent it from opening until after the pressure within said retort has been reduced to a predetermined minimum value, actuating means operated by said pressure responsive control means when the pressure is reduced to the predetermined minimum to open said drain valve for draining away the spent cooling water, and a temperature responsive control element disposed to respond to the temperature of the spent cooling water and operative upon said control system when the temperature of the cooling water falls below a predetermined minimum to effect termination of the processing cycle.

References Cited in the file of this patent

UNITED STATES PATENTS

| | | |
|---|---|---|
| 1,975,073 | Chapman | Oct. 2, 1934 |
| 2,082,460 | Olmstead | June 1, 1937 |
| 2,128,206 | Hewitt | Aug. 23, 1938 |
| 2,351,326 | Ergbuth | June 13, 1944 |
| 2,472,970 | Hanna | June 14, 1949 |
| 2,536,116 | Wilbur | Jan. 2, 1951 |
| 2,605,969 | Sanders | Aug. 5, 1952 |
| 2,629,312 | Davis | Feb. 24, 1953 |
| 2,680,591 | Churchman | June 8, 1954 |
| 2,816,841 | Kaap | Dec. 17, 1957 |
| 2,849,944 | Prickett et al. | Sept. 2, 1958 |

UNITED STATES PATENT OFFICE
CERTIFICATE OF CORRECTION

Patent No. 2,972,293                  February 21, 1961

Robert W. Strehlow et al.

It is hereby certified that error appears in the above numbered patent requiring correction and that the said Letters Patent should read as corrected below.

Column 2, line 11, after "system" insert -- arranged to effect automatic processing of material confined --; line 26, for "beating" read -- heating --; same column 2, line 33, for "sop, he" read -- stop, the --.

Signed and sealed this 21st day of November 1961.

(SEAL)
Attest:

ERNEST W. SWIDER                        DAVID L. LADD
Attesting Officer                           Commissioner of Patents